United States Patent
Ostby et al.

(10) Patent No.: US 11,321,336 B2
(45) Date of Patent: *May 3, 2022

(54) SYSTEMS AND METHODS FOR ENTERPRISE DATA SEARCH AND ANALYSIS

(71) Applicant: SAVANTX, INC., Jackson, WY (US)

(72) Inventors: David Linus Ostby, Las Cruces, NM (US); Edmond Audrey Heinbockel, Jackson, WY (US)

(73) Assignee: SAVANTX, INC., Jackson, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/139,692

(22) Filed: Dec. 31, 2020

(65) Prior Publication Data

US 2021/0149892 A1   May 20, 2021

Related U.S. Application Data

(63) Continuation of application No. 16/457,160, filed on Jun. 28, 2019, now Pat. No. 10,915,543, which is a continuation-in-part of application No. 14/931,709, filed on Nov. 3, 2015, now Pat. No. 10,372,718, and a continuation-in-part of application No. 14/931,697, filed on Nov. 3, 2015, now Pat. No. 10,360,229.

(60) Provisional application No. 62/074,289, filed on Nov. 3, 2014.

(51) Int. Cl.
| | |
|---|---|
| *G06F 16/22* | (2019.01) |
| *G06F 16/2455* | (2019.01) |
| *G06F 16/2457* | (2019.01) |
| *G06F 16/248* | (2019.01) |
| *G06F 16/28* | (2019.01) |

(52) U.S. Cl.
CPC ........ *G06F 16/248* (2019.01); *G06F 16/2246* (2019.01); *G06F 16/2455* (2019.01); *G06F 16/24575* (2019.01); *G06F 16/285* (2019.01)

(58) Field of Classification Search
CPC .............. G06F 16/248; G06F 16/2455; G06F 16/24575; G06F 16/2246; G06F 16/285
See application file for complete search history.

(56) References Cited

U.S. PATENT DOCUMENTS

| | | |
|---|---|---|
| 3,916,387 A | 10/1975 | Woodrum |
| 4,839,853 A | 6/1989 | Deerwester |
| 5,450,523 A | 9/1995 | Zhao |

(Continued)

OTHER PUBLICATIONS

European Patent Office; Extended European Search Report for EP Patent Application No. 18761079.5 mailed from the European Patent Office dated Oct. 22, 2020.

(Continued)

*Primary Examiner* — Jorge A Casanova
(74) *Attorney, Agent, or Firm* — Fitch, Even, Tabin & Flannery LLP

(57) ABSTRACT

A system and method for enterprise searching of documents. The system comprises a computing system configured to receive one or more search terms, and responsively analyze a group of documents to return analysis results. A method for enterprise searching includes indexing the group of documents, determining relevant terms and measuring the context between terms. Relevant portions of documents, also called passages of interest, are determined as part of the analysis process. The analysis also uses a calculated importance value of terms as part of the analysis process.

16 Claims, 5 Drawing Sheets

(56) References Cited

U.S. PATENT DOCUMENTS

| | | |
|---|---|---|
| 5,608,622 A | 3/1997 | Church |
| 5,619,709 A | 4/1997 | Caid |
| 5,774,888 A | 6/1998 | Light |
| 6,269,153 B1 | 7/2001 | Carpenter |
| 6,282,538 B1 | 8/2001 | Woods |
| 6,493,709 B1 | 12/2002 | Aiken |
| 6,523,026 B1 | 2/2003 | Gillis |
| 6,532,469 B1 | 3/2003 | Feldman |
| 6,629,097 B1 | 9/2003 | Keith |
| 6,665,641 B1 | 12/2003 | Coorman |
| 6,741,959 B1 | 5/2004 | Kaiser |
| 6,850,937 B1 | 2/2005 | Hisamitsu |
| 6,970,881 B1 | 11/2005 | Mohan |
| 7,548,910 B1 | 6/2009 | Chu |
| 7,680,647 B2 | 3/2010 | Moore |
| 7,809,551 B2 | 10/2010 | Sandor |
| 8,108,208 B2 | 1/2012 | Maekelae |
| 8,650,187 B2 | 2/2014 | Chen |
| 8,930,176 B2 | 1/2015 | Li |
| 8,996,523 B1 | 3/2015 | Fisher |
| 9,552,412 B1 | 1/2017 | Lowe |
| 9,619,565 B1 | 4/2017 | Dean |
| 9,715,495 B1 | 7/2017 | Tacchi |
| 9,754,020 B1 | 9/2017 | Kosloski |
| 9,779,141 B2 | 10/2017 | Jain |
| 10,102,274 B2 | 10/2018 | Mittal |
| 10,198,499 B1 | 2/2019 | Mcnair |
| 10,242,090 B1 | 3/2019 | Kosloski |
| 10,360,229 B2 | 7/2019 | Ostby |
| 10,372,718 B2 | 8/2019 | Ostby |
| 10,528,668 B2 | 1/2020 | Ostby |
| 10,817,671 B2 | 10/2020 | Ostby |
| 10,915,543 B2 | 2/2021 | Ostby |
| 2001/0037328 A1 | 11/2001 | Pustejovsky |
| 2002/0032564 A1 | 3/2002 | Ehsani |
| 2002/0123989 A1 | 9/2002 | Kopelman |
| 2002/0128821 A1 | 9/2002 | Ehsani |
| 2003/0033582 A1 | 2/2003 | Klein |
| 2003/0097352 A1 | 5/2003 | Gutta |
| 2003/0097353 A1 | 5/2003 | Gutta |
| 2003/0177000 A1 | 9/2003 | Mao |
| 2003/0177112 A1 | 9/2003 | Gardner |
| 2003/0187643 A1 | 10/2003 | Van Thong |
| 2004/0003401 A1 | 1/2004 | Gutta |
| 2004/0078190 A1 | 4/2004 | Fass |
| 2005/0120011 A1 | 6/2005 | Dehlinger |
| 2005/0273812 A1 | 12/2005 | Sakai |
| 2006/0116994 A1 | 6/2006 | Jonker |
| 2007/0112908 A1 | 5/2007 | Jiandong |
| 2007/0118491 A1 | 5/2007 | Baum |
| 2007/0294235 A1 | 12/2007 | Millett |
| 2008/0071763 A1 | 3/2008 | Ferrenq |
| 2008/0125161 A1 | 5/2008 | Ergen |
| 2008/0235209 A1 | 9/2008 | Rathod |
| 2008/0294680 A1 | 11/2008 | Powell et al. |
| 2008/0306726 A1 | 12/2008 | Levy |
| 2009/0226872 A1 | 9/2009 | Gunther |
| 2009/0319518 A1 | 12/2009 | Koudas |
| 2009/0327279 A1 | 12/2009 | Adachi |
| 2010/0031240 A1 | 2/2010 | Drumm |
| 2010/0114890 A1 | 5/2010 | Hagar |
| 2010/0138428 A1 | 6/2010 | Uchino |
| 2010/0150453 A1 | 6/2010 | Ravid |
| 2010/0257159 A1 | 10/2010 | Uematsu |
| 2010/0324883 A1 | 12/2010 | Platt |
| 2011/0004610 A1 | 1/2011 | Rose |
| 2011/0008020 A1 | 1/2011 | Inoue |
| 2011/0131595 A1 | 6/2011 | Xue |
| 2011/0184723 A1 | 7/2011 | Huang |
| 2011/0191310 A1 | 8/2011 | Liao |
| 2011/0214080 A1 | 9/2011 | Agrawal |
| 2011/0219003 A1 | 9/2011 | Bi |
| 2011/0314006 A1 | 12/2011 | Sweeney |
| 2012/0209853 A1 | 8/2012 | Desai |
| 2012/0215806 A1 | 8/2012 | Pryakhin |
| 2012/0253793 A1 | 10/2012 | Ghannam |
| 2012/0278341 A1 | 11/2012 | Ogilvy |
| 2012/0303626 A1 | 11/2012 | Friedmann |
| 2012/0330968 A1 | 12/2012 | Lee |
| 2013/0138428 A1 | 5/2013 | Chandramouli |
| 2013/0159348 A1 | 6/2013 | Mills |
| 2013/0262361 A1 | 10/2013 | Arroyo |
| 2014/0040275 A1 | 2/2014 | Dang |
| 2014/0058723 A1 | 2/2014 | Shen |
| 2014/0067391 A1 | 3/2014 | Ganapathiraju |
| 2014/0075004 A1 | 3/2014 | Van Dusen |
| 2014/0108006 A1 | 4/2014 | Vogel |
| 2014/0114897 A1 | 4/2014 | Nakamura |
| 2014/0163953 A1 | 6/2014 | Parikh |
| 2014/0214419 A1 | 7/2014 | Rao |
| 2014/0258301 A1 | 9/2014 | Misra |
| 2014/0277752 A1 | 9/2014 | Chang |
| 2014/0280113 A1 | 9/2014 | Hohwald |
| 2015/0135053 A1 | 5/2015 | Doornenbal |
| 2015/0213096 A1 | 7/2015 | Montgomery |
| 2015/0227579 A1 | 8/2015 | Cantarero |
| 2015/0302084 A1 | 10/2015 | Stewart |
| 2015/0339369 A1 | 11/2015 | Rais-Ghasem |
| 2016/0012115 A1 | 1/2016 | Vata |
| 2016/0055134 A1 | 2/2016 | Sathish |
| 2016/0103917 A1 | 4/2016 | Talmor |
| 2016/0124947 A1 | 5/2016 | Heinbockel |
| 2016/0125038 A1 | 5/2016 | Heinbockel |
| 2016/0162466 A1 | 6/2016 | Munro |
| 2016/0321241 A1 | 11/2016 | Mitsuishi |
| 2017/0011029 A1 | 1/2017 | Chatterjee |
| 2017/0024186 A1 | 1/2017 | Fazl Ersi |
| 2017/0024466 A1 | 1/2017 | Bordawekar |
| 2017/0068655 A1 | 3/2017 | Wang |
| 2017/0068738 A1 | 3/2017 | Ikeda |
| 2017/0087416 A1 | 3/2017 | Hu |
| 2017/0091198 A1 | 3/2017 | Zhang |
| 2017/0115131 A1 | 4/2017 | Huang |
| 2017/0156203 A1 | 6/2017 | Shiue |
| 2017/0243399 A1 | 8/2017 | Troy |
| 2017/0323219 A1 | 11/2017 | Shahrzad |
| 2017/0371865 A1 | 12/2017 | Eck |
| 2018/0005414 A1 | 1/2018 | Lee |
| 2018/0018317 A1 | 1/2018 | Cheng |
| 2018/0032517 A1 | 2/2018 | English |
| 2018/0054216 A1 | 2/2018 | Sengoku |
| 2018/0082197 A1 | 3/2018 | Aravamudan |
| 2018/0121539 A1 | 5/2018 | Ciulla |
| 2018/0173693 A1 | 6/2018 | Vaknin |
| 2018/0196798 A1 | 7/2018 | Yadati |
| 2018/0219897 A1 | 8/2018 | Muddu |
| 2018/0241713 A1 | 8/2018 | Subba |
| 2018/0246879 A1 | 8/2018 | Ostby |
| 2018/0260475 A1 | 9/2018 | Zhang |
| 2018/0314687 A1 | 11/2018 | Nishimoto |
| 2018/0330248 A1 | 11/2018 | Burhanuddin |
| 2019/0266166 A1 | 8/2019 | Venkataraman |
| 2019/0324959 A1 | 10/2019 | Ostby |
| 2020/0104370 A1 | 4/2020 | Ostby |
| 2020/0349324 A1 | 11/2020 | Ostby |

OTHER PUBLICATIONS

Ostby; U.S. Appl. No. 15/907,251, filed Feb. 27, 2018.
Ostby; U.S. Appl. No. 16/457,160, filed Jun. 28, 2019.
Ostby; U.S. Appl. No. 16/691,027, filed Nov. 21, 2019.
Ostby; U.S. Appl. No. 14/931,709, filed Nov. 3, 2015.
Ostby; U.S. Appl. No. 16/926,353, filed Jul. 10, 2020.
Otsby; U.S. Appl. No. 14/931,697, filed Nov. 3, 2015.
PCT; International Search Report and Written Opinion of the International Searching Authority for PCT/US2018/020055 dated Jun. 7, 2018 (20224-142282-US).
USPTO; Advisory Action issued in U.S. Appl. No. 14/931,709 dated Jan. 30, 2019.
USPTO; Advisory Action issued in U.S. Appl. No. 14/931,709 dated Jun. 11, 2018.
USPTO; Examiner Interview Summary issued in U.S. Appl. No. 14/931,697 dated Jan. 18, 2019.

(56) References Cited

OTHER PUBLICATIONS

USPTO; Final Office Action issued in U.S. Appl. No. 14/931,697 dated Sep. 7, 2018.
USPTO; Final Office Action issued in U.S. Appl. No. 14/931,709 dated Mar. 27, 2018.
USPTO; Final Office Action issued in U.S. Appl. No. 15/907,251 dated Jun. 21, 2019.
USPTO; Non-Final Office Action issued in U.S. Appl. No. 14/931,697 dated Mar. 14, 2018.
USPTO; Non-Final Office Action issued in U.S. Appl. No. 14/931,709 dated Aug. 3, 2018.
USPTO; Non-Final Office Action issued in U.S. Appl. No. 14/931,709 dated Nov. 14, 2017.
USPTO; Non-Final Office Action issued in U.S. Appl. No. 15/907,251 dated Jan. 29, 2019.
USPTO; Non-Final Office Action issued in U.S. Appl. No. 16/691,027 dated Apr. 17, 2020.
USPTO; Notice of Allowance issued in U.S. Appl. No. 14/931,697 dated Jan. 18, 2019.
USPTO; Notice of Allowance issued in U.S. Appl. No. 14/931,697 dated Mar. 12, 2019.
USPTO; Notice of Allowance issued in U.S. Appl. No. 14/931,709 dated Apr. 1, 2019.
USPTO; Notice of Allowance issued in U.S. Appl. No. 15/907,251 dated Sep. 3, 2019.
USPTO; Notice of Allowance issued in U.S. Appl. No. 16/457,160 dated Sep. 10, 2020.
USPTO; Notice of Allowance issued in U.S. Appl. No. 16/691,027 dated Jul. 28, 2020.
USPTO: Final Office Action issued in U.S. Appl. No. 14/931,709 dated Nov. 2, 2018.
USPTO; Ex Parte Quayle Office Action issued in U.S. Appl. No. 16/926,353 dated Nov. 4, 2021.
USPTO; Notice of Allowance issued in U.S. Appl. No. 16/926,353 dated Jan. 19, 2022.

SYSTEMS AND METHODS FOR ENTERPRISE DATA SEARCH AND ANALYSIS

This application is a continuation of U.S. patent application Ser. No. 16/457,160 entitled SYSTEMS AND METHODS FOR ENTERPRISE DATA SEARCH AND ANALYSIS filed Jun. 28, 2019, which is a continuation-in-part of U.S. patent application Ser. No. 14/931,697 entitled SYSTEMS AND METHODS FOR ENTERPRISE DATA SEARCH AND ANALYSIS filed Nov. 3, 2015, now U.S. Pat. No. 10,360,229, issued Jul. 23, 2019, which claims the benefit of U.S. Provisional Application No. 62/074,289 entitled ENTERPRISE SEARCH filed Nov. 3, 2014, and is a continuation-in-part of U.S. patent application Ser. No. 14/931,709 entitled SYSTEMS AND METHODS FOR ENTERPRISE DATA SEARCH AND ANALYSIS filed Nov. 3, 2015, now U.S. Pat. No. 10,372,718, issued Aug. 6, 2019, which claims the benefit of U.S. Provisional Application No. 62/074,289 entitled ENTERPRISE SEARCH filed Nov. 3, 2014, all of which are incorporated in their entirety herein by reference.

BACKGROUND OF THE INVENTION

1. Field of the Invention

The present invention relates generally to data searching methods and systems, and more particularly, to enterprise searching.

2. Discussion of the Related Art

As computer systems track and store more and more data in databases or other digital formats, search technology for searching through and finding items within massive quantities of stored has become essential for data-driven systems. Enterprise searching as commonly known in the art is the practice of identifying and enabling specific content (files) across multiple enterprise-type sources, such as databases and intranets, to be indexed, searched, and displayed to authorized users.

Stored enterprise-type files may include many different file formats, such as HTML, PDF, XLS, DOC, PPT, TXT, JPG, PNG, TIF, etc. Microfiche is also still in use but has mostly been converted to other formats such as JPG and PDF. Each file may contain information of potential interest and needs to be searchable regardless of format. Many of these file formats are not readily searchable in their native format.

A currently common protocol for storing data on a computer systems is to scan a hardcopy document into PDF form using a photocopier or other scanner. Using this method the text on the document pages is captured as an image file. This process destroys the ability to retrieve the text without running the imaged document through an optical character recognition (OCR) converter.

Databases may be very large: for example, only one year's worth of data included in an exemplary database may be over 100,000 files. Over many years, millions of files may accumulate that require search capability.

Data is stored in three basic types: structured, semi-structured and unstructured. Structured data includes most data found in fields of a typical Structured Query Language (SQL) database. SQL has been the primary database technology of the last 30+ years. For instance, a field in an SQL database might be called zipcode and another field might be called paydate. The zipcode field will only contain zipcodes. The paydate field will only contain dates. This guarantee of field contents gives structure to the data, and makes it possible to run unambiguous SQL commands against the data with a high degree of certainty as to the meaning of the results.

Text is one example of unstructured data. Text can contain many different types of information, and is ambiguous in the following sense: there are many different word combinations that can express the same information. Whenever a database has a text field (like a comment field), or has a document attachment, the text contained therein is considered unstructured. Unstructured text is difficult to process into information as compared to structured data.

Semi-structured data is a combination of structured and unstructured data. An example of semi-structured data is when an organization attempts to structure text passages by imbedding metacodes within the text. Metacodes can allow the text to be searched more easily, assuming the metacodes are accurately chosen and placed in the text. Metacoding can be very tedious to implement.

There are five levels of technology that can be applied to the general search problem. Some are easy and commonly applied. Others are somewhat difficult, and others are so difficult or expensive that they are rarely found in applications.

The first level of search technology is databases. When databases came into common usage in the 1970s, it was a great boon to business: it was possible to have electronic invoicing, payroll, etc. These were, at first, highly structured. And as long as the database was highly structured, relevant data could be retrieved with straightforward search commands and no ambiguity in the results.

Later, databases were used to store text comments, descriptions, etc. Most of these text fields were printed on forms, or perhaps used by online customer service employees. The need to search through this information was minimal.

In the 80s and 90s, document control systems were developed to help manage the fast growing quantity of documents, reports, publications, etc. These databases stored pointers to electronic versions of written documents. This started the wave of unstructured data. Searching this large quantity of unstructured text proved to be difficult.

Metacoding may be used to provide some structure to the unstructured text, but is time consuming and tedious procedure to implement as a human must read each document and code it with keywords which are then put into a database to facilitate searching.

The second level of search technology is text indexing. Text indexing allows users to rapidly find, for instance, all documents that have a given word. To form the index, a computer goes through all the text in the documents of the corpus and creates an index for each found word. For example, an index allows the computer to rapidly return all the documents that contain the exact words "valve" and "failure". This is a big step forward, as it reduces the pile of potential documents by 90% to 99% on average: a user does not have to read through each document looking for the search terms.

Text indexing is the current, normal 'state of the art' for most search operations. It is a common stopping place, technologically speaking: when you see a search box, say, on a web site, you are likely using a search technology at this level.

There are very serious limits to text indexing, as it will miss a lot of relevant results, but even more seriously, it will include many completely irrelevant results.

The third level of search technology is variation indexing, i.e. including variations of a word. A variation of a word is called a 'stem' of that word. For instance, a stem of the word 'valve' is 'valves'. Stems of the word 'failure' include 'fails', 'failing', 'failed', 'failures', etc. If you have a text index to a corpus, including stems of search terms before retrieval will return files that would be missed with the simpler text indexing.

However, the number of irrelevant results will also increase. For example, if a user is searching for a document regarding failure of a valve, searching for documents including stems of "valve" and "failure" may return many files including those variations but not actually including information relevant to valve failure.

Although word stem search is relatively easy to implement, it is not seen often except in connection with higher search technologies, as variation search increases the number of results returned, but also increases the number of irrelevant search results.

The fourth level of search technology is word frequency indexing. The next level of technology that can be applied to search is to analyze word frequencies. For example, if a text document uses the word 'nuclear' several times, it is likely that at least a portion of the document has something to do with nuclear substance, and if the document also includes certain words multiple times like 'plant', 'engineering', 'energy', and/or 'reactor', then the document can be classified to a high degree of specificity. Implementation of word frequency indexing is more difficult, because some words like 'the', 'and', 'a' are used frequently, so a great deal of statistical work is required to make this level of technology function properly.

In fact, this level of search technology is difficult enough that often users are encouraged/required to metacode their documents so that a lower level of search technology can still produce good results.

The fifth level of search technology is co-occurrence indexing. If words are occur in proximity to each other, i.e., exhibit co-occurrence, then they provide context and meaning to each other. This requires a large amount of processing power, as for each document not only are all the words analyzed for frequency, but their location must be analyzed relative to all the other words in the document. It is difficult to pre-compute co-occurrences (as pre-computing co-occurrences would require an index for all co-occurring word pairs) so the co-occurrence indexing must be computed at the time of the search.

Latent Semantic Analysis, or LSA, has been used for analyzing 'co-occurred' terms. LSA works well for windowing (e.g. excluding documents that include "valve" and "failure" but are not about "valve failure"). LSA also works well for different words which actually are synonymous in a given context (e.g. "failure" and "leaking"). LSA works by performing mathematical processing on word set under the general idea that a word is modified or defined by the words surrounding it, i.e. its context. LSA requires a large amount of computer processing capability and also data scientists to create, develop, manage and deploy LSA solutions. LSA does not address the context problem of words with different meanings in context (e.g. "ladder of success" vs 'ladder accident")

Thus, a novel solution is needed that addresses all high-level search requirements without requiring high computing power or high human involvement.

SUMMARY OF THE INVENTION

Several embodiments of the invention advantageously address the needs above as well as other needs by providing a method of generating a search result substantially in real time, comprising the steps of: indexing, using a computing device comprising at least a processor and a non-transitory memory, a plurality of documents, each document comprised of a plurality of terms, wherein the indexing relates each term to documents including that term; inputting into the computing device at least one search term; upon determining that at least one search term has at least one stem, identifying all stems of search terms, wherein the at least one search term and the stems of search terms comprise the expanded search terms; identifying of a plurality of search term documents including at least one occurrence of at least one search term; identifying of search term stem documents including at least one occurrence of at least one search term stem, wherein the search term documents and the search term stem documents comprise the search document set; identifying at least one extract of interest, wherein each extract of interest is a portion of one document of the search document set, wherein the extract of interest includes at least one expanded search term within a context window, wherein the context window is a consecutive number of terms in a document; and determining passages of interest, wherein each passage of interest comprise at least one extract of interest.

In another embodiment, the invention can be characterized as a system for generating a search results substantially in real time, comprising: a plurality of computing nodes comprising at least a processor coupled to a non-transitory memory; at least one network-attached storage device coupled to the plurality of computing nodes; a system management module comprising at least a processor coupled to a non-transitory memory, the system management coupled to the plurality of nodes and configured to run at least one system management software; a network management module coupled to the system management module and configured to communicate with a network, wherein the system is configured to perform the steps of: indexing a plurality of documents, each document comprised of a plurality of terms, wherein the indexing relates each term to documents including that term; receiving at least one search term; upon determining that at least one search term has at least one stem, identifying all stems of search terms, wherein the at least one search term and the stems of search terms comprise the expanded search terms; identifying of a plurality of search term documents including at least one occurrence of at least one search term; identifying of search term stem documents including at least one occurrence of at least one search term stem, wherein the search term stem documents and the search term stem documents comprise the search document set; identifying at least one extract of interest, wherein each extract of interest is a portion of one document of the search document set, wherein the extract of interest includes at least one expanded search term within a context window, wherein the context window is a consecutive number of terms in a document; and determining passages of interest, wherein each passage of interest comprises at least one extract of interest.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
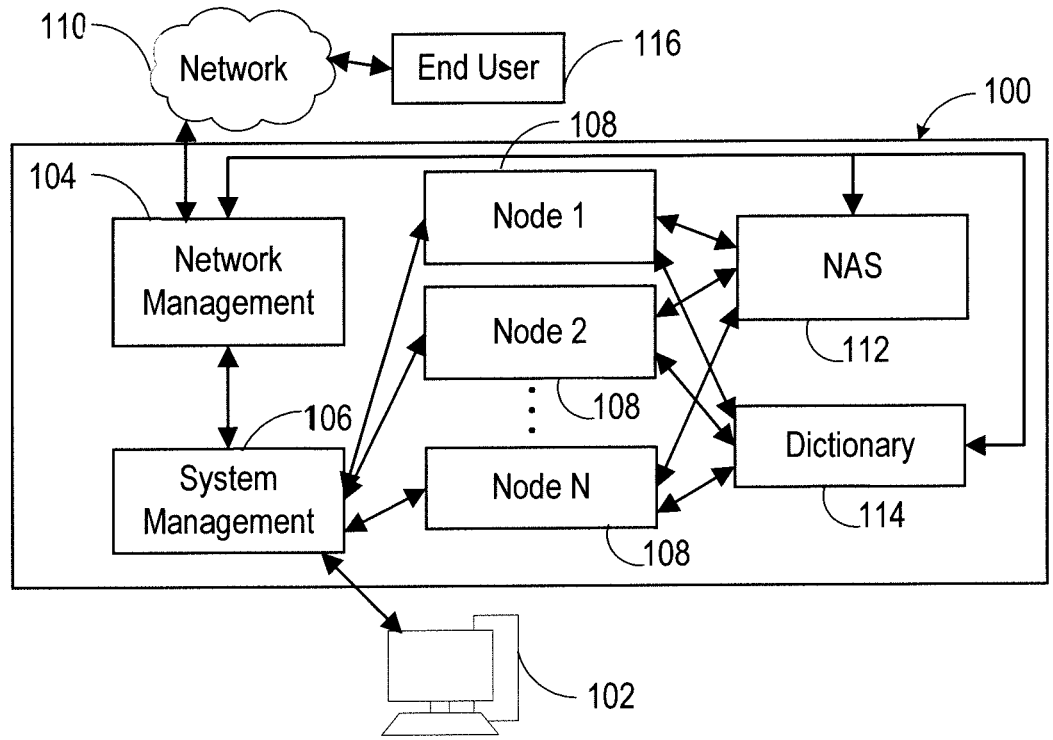
FIG. 1 is a schematic diagram of an exemplary search system in accordance with one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As used herein, a term is a unit of written language that is a unique collection of letters, numbers, and/or special characters. A word is a term, but not all terms are words. Terms may include symbols and numbers. Examples of non-word terms include acronyms, e.g. 'NRC', identifiers of all sorts, e.g. 'T-02-Q-4', and terms like documents section numbers, e.g. '3.2.4' and '2.ii.3a'.

Referring first to FIG. 1, a schematic diagram of an exemplary search system 100 in accordance with one embodiment of the present invention is shown. Shown are a management interface 102, a network management module 104, a system management module 106, a plurality of nodes 108, a network 110, a network-attached storage (NAS) 112, a dictionary module 114, and an end user 116.

While not illustrated in FIG. 1, it will be understood by those of ordinary skill in the art that at least one processor (CPU) and non-transitory memory coupled to the CPU are included in the system 100 and are used by system components as required to perform their functions. In most embodiments, the system 100 will comprise multiple CPUs and non-transitory memory elements.

The system management module 106 is a centralized management computing module that centrally receives search processes (typically through the network management module 104) and pushes the processes to the plurality of processing nodes 108. The system management module 106 provides management functions such as resource locking, leader election and process synchronization. In one embodiment, the system management module 106 comprises 1, 3, 5 or more computing devices, each including a processor and non-transitory memory. In one embodiment, the system management computing devices run the Linux operating system and Apache Zookeeper software or other suitable management software. Each node 108 includes at least one processing kernel 202, as described below in FIG. 2.

The system management module 106 is coupled to the network management module 104, which is configured to communicate with the end user 116 through the network 110. The network 110 may be a local network. In some embodiments the network is the same network as for the system 100. In other embodiments the network is a remote network, for example the Internet. The end user 116 is in communication with the system 100 through the network 110. The management interface 102 is coupled to the search system 100 for monitoring of the system components. In one embodiment the management interface 102 includes a keyboard, a display, and a mouse. The system 100 is also configured to send/receive data to a search application running on a personal computing device (not shown). The system 100 is also configured to send and receive data via an internet browser or an application running on an internet browser via the network management module 104 (in one embodiment a web server).

The nodes 108 are each coupled to at least one network-attached storage (NAS) system 112 that is used to store the various files output as a result of search requests. The NAS 112 provides common storage for source documents, indexes, statistics, search results, etc. For multiple NAS systems 112, some NAS 112 may operate at higher speeds than others to provide, for example, faster access to search results. Each node 108 is also coupled to the dictionary module 114, described further below.

Figure 2:
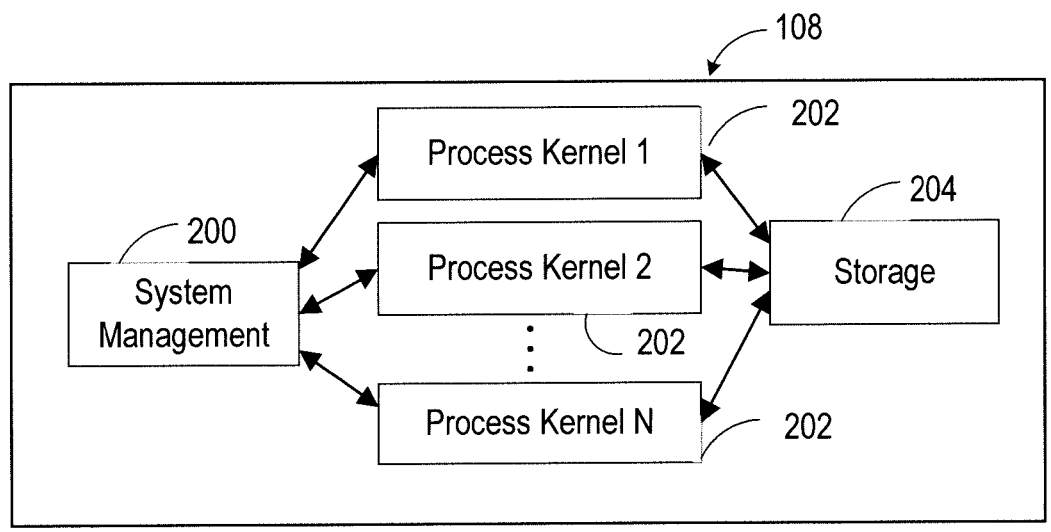
FIG. 2 is a schematic diagram of an exemplary node of the search system.

Referring next to FIG. 2, a schematic diagram of an exemplary node 108 of the search system 100 is shown. Shown are a node system management module 200, the plurality of processing kernels 202, and a node storage 204.

While other configurations known in the art may be utilized for the main processing nodes 108, in the embodiment shown in FIG. 2 each node 108 comprises a node system management module 200 comprising system management module 106 software duplicated across each processing node 108, the software managing processes received from the system management module 106. The system management module 106 and the node system management module 200 are coupled to the plurality of processing kernels 202. The computing kernels 202 perform most of the data processing, and receive processes and return data via the system management module 106 and/or the node system management module 200. The plurality of kernels 202 are also coupled to the node storage 204.

Figure 3:
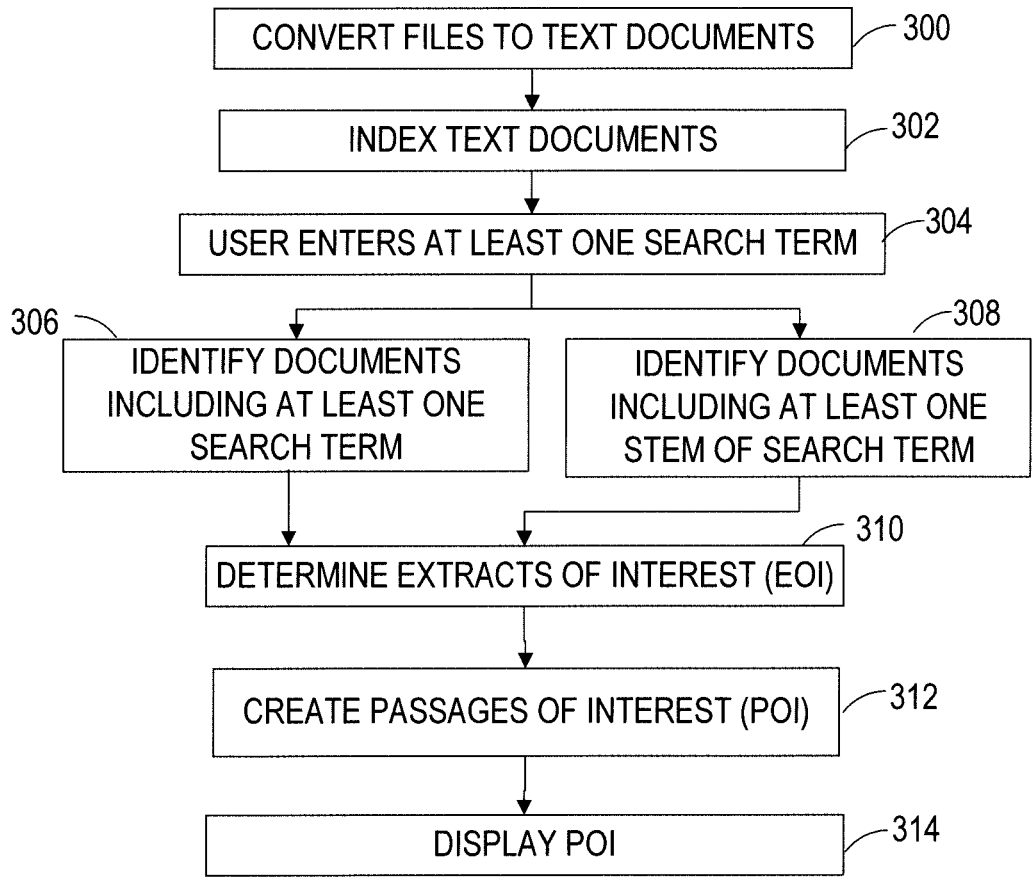
FIG. 3 is a flowchart diagram of an enterprise search method in one embodiment of the present invention.

Referring next to FIG. 3, a flowchart diagram of an enterprise search method is shown. Shown are a text conversion step 300, an indexing step 302, a user inputs search terms step 304, an identify documents with search terms step 306, an identify documents with search term stems step 308, a determine extracts of interest (EOI) step 310, a create passages of interest step 312, and a display POI step 314.

It will be understood by those of ordinary skill in the art that the search system 100 will utilize the appropriate modules for carrying out the various tasks. For example, the web server (network management module 104) will handle communications with the end user 116, and the processing node 108 will receive a command from the network management module 104, perform the command (referencing files from the network-attached storage system 112 and node storage 204 as necessary) and update files on the NAS 112, or update files residing on node storage 204, and/or issue more commands (or data) to the network management module 104.

The first two method steps, the text conversion step 300 and the indexing step 302, may be carried out prior to the entering of a search query by the end user 116, or may be performed on the group of files after the search query is entered.

During the first text conversion step 300, files for searching are converted into text if the file is not already in text form. Text conversion may be done by any method known in the art, for example, performing OCR on a .tif file. While text conversion is not commonly available for audio or video files, future text conversion hardware/software may be available for conversion of audio/video to text. Custom imaging processing algorithms may be used to convert drawings, such as engineering drawings, into text files (also referred to as documents) including symbols readable by the system 100.

In the second indexing step 302, all text files are indexed by the nodes 108 as directed by the system management module 106. In some embodiments the indexing is continually updated as new files are added. The indexing includes a listing of all terms (words, symbols, etc.) found in the text files, where each term is indexed to the text file or files where that term is found, i.e., the index relates each term to one or more documents including that term. In one embodiment, terms such as 'a', 'the' and 'and' are not indexed. The index includes roots of the terms found in the text files. For example, if the term 'failure' is found in one text file, the text file is also indexed to the root of failure, 'fail'. The dictionary module 114 comprises a reference for term roots and supplies the term roots to the nodes 108 during the indexing process. The dictionary module 114 also supplies variations for words (i.e. stems), e.g. for the word 'fail', the stems include 'fails', 'failure' and 'failing'. All text terms are indexed, not only words, so that all information included in the text files is available for the search process.

In one embodiment, the indexing includes feature indexing of the text files. Feature indexing compares properties of each file to criteria for file classifications, and assigns the file to a certain classification if the file meets the criteria for that classification. Features are extracted from the text files at the same time as the text indexing and are stored in a feature index. The classification process is performed using the feature index.

Examples of file classifications include Training Manual, Observation, Accident, Outage, Death, Mechanical, Electrical, Housekeeping, Maintenance, Design, Specification and Human Performance.

In one example, text files with features containing the terms 'education' and 'student', and context term pairs 'class schedule' and 'dangerous setup' may be classified as Training Manual files. A text file may have multiple classifications. Classification algorithms are available in the art to perform the classification, such as the Maximum Entropy Method (MEM) and Machine Learning.

A unique document ID may be generated for each text file during the indexing process, and stored in a document ID file. In one embodiment the hashcode is performed on the filename of the text file. Therefore, the same filename will produce the same hashcode every time, even if two files are submitted with different content by under the same filename.

In one embodiment, during indexing, a text extraction file is generated for each indexed text file and stored on the system 100 with a link to the original text file. To generate the text extraction file, in one embodiment each term in the text file is hashed according to a hashcode (i.e. creating an identifier for each term, also referred to as a 'term ID'). In one embodiment the hashcode is an 8-character, base-36 number using the digits '0' through '9' and 'a' through 'z'. Hence the hashcode for 'electricity' could be 'kah77un8'.

In the next user inputs search terms step 304, the end user 116 enters a search into the system 100 for searching the selected files, which is received by the network management module 104, via the network 110. The search includes one or more terms. In one embodiment the user inputs the search term into a computing device communicatively coupled to the search system 100, using a user interface application running on the computing device. In some embodiments, the user interface application may be a web page on an internet browser. In some embodiments, the search term may be entered directly to the search system 100 using the display/input module. In one example, the user enters the search "valve failure", including two search terms: "valve" and "failure".

In one embodiment, the system 100 identifies a list of non-allowed search characters, for example ISO-Latin 1 characters. The system 100 may include rules of replacement for non-allowed search characters, for example, to replace non-allowed characters with blank text. The search is then "cleaned", i.e. non-relevant terms such as articles are removed. All remaining terms are then the search terms. The system 100 also creates a directory of search folders for the search linked to a search identifier. Search result files are then stored in the search folders.

The next two steps, the identify documents with search terms step 306, and the identify documents with search term stems step 308, may occur concurrently, as shown in FIG. 2, or may run sequentially. In the identify documents with search terms step 306, the search system 100 searches all of the text files, using the index, and returns a document set of all documents that contain at least one search term in the documents. For example, the search input "valve failure" would return the set of all documents including the term 'valve' or the term 'failure' or both the term 'valve' and the term 'failure'. The resulting group of documents comprises the straight term document set.

The identify documents with search term stems step 308 is similar to the identify documents with search terms step 306, with the exception that a returned document set includes all documents including at least one variation of one search term. For example, for the search terms 'valve failure', documents including the failure variation 'fail' would be found. The resulting document group is the term variation document set. A set of terms comprising both the search terms and the search term variations is the set of expanded search terms. A set of text files comprising both the straight term document set and the term variation document set is the search document set. In both the identify documents with search terms step 306 and the identify documents with search term stems step 308, documents including multiple search terms (in the event of a multi-term search query) or search term variations may be prioritized to be identified first, before documents including fewer search terms For example, during the identify documents with search term stems step 308, for the search terms "valve failure' documents including the failure variation 'fail' and the term 'valve' would be identified before documents including only the term 'fail'.

In one embodiment, during the identify document with search terms step 306 and the identity documents using search term stems step 308, each expanded search term is assigned an alphanumeric hashcode (i.e. a search term identifier, also referred to as an 'expanded search term ID') using the same hashcode used during the indexing process. In this way, the expanded search term hashcodes) can be compared to the hashcodes in the text extraction files. The system 100 then searches the index files for references to text files (using the text extraction files) including the expanded search terms.

The process then proceeds to the determine extracts of interest (EOI) step 310. The text files of the search document set are analyzed for extracts of interest.

An EOI is defined as a portion of text including at least one expanded search term in a context window. The context window is a number of consecutive terms in the text document. The number of terms in the context window is generally between 12 and 128. For a single search term, the EOI is the portion of text including the context window centered on the single search terms. Two expanded search terms are considered in context if the two expanded search terms are separated by fewer terms than the context window. Using this method, the context is determined by putting all terms in one document into a consecutive list, and then locating each expanded search term in the list. Any search terms that are closer together than the context window size are deemed to be in context with each other. Once expanded search terms are determined to be in context, a portion of the text surrounding the term or terms can be extracted. An extract of interest is a portion of the document formed in such a way to include a few terms before the first appearance of a search term, plus a few terms following the last search term.

The process then proceeds to the create passages of interest step 312. Passages of interest (POI) are created from EOI; in many cases one EOI will become one POI without changes. However, EOI can often overlap or come very close to touching. In those cases, several EOI will be combined to form one larger POI. For example, if one document includes a lengthy discussion of a valve failure, the document may include several EOI in a row, or even overlapping EOI. In that case, the POI would include a single larger portion including the EOIs so that the 'snippet' EOIs are not disjointed.

In the final display POI step 314, the POI are displayed, in one embodiment as a web page. The web page of search results will typically show the search terms at the top of the page, and a listing of POI results, one POI per row, down the web page. Columns shown for the POI may include a link to the document including the POI, the date of the document, and the document text, among other elements such as page number, database origin, etc.

Figure 4:
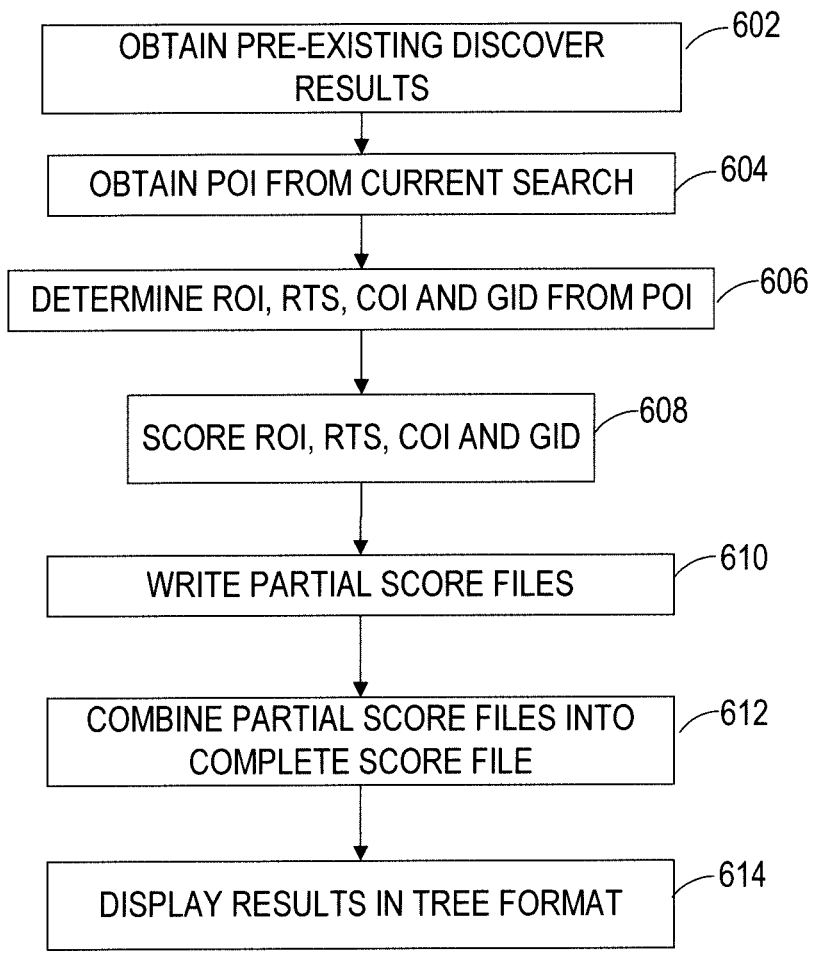
FIG. 4 is a flowchart diagram of a discovery analysis in one embodiment of the present invention.

Referring next to FIG. 4, a method for discovery analysis is shown in one embodiment of the present invention. Shown are an obtain pre-existing discover results step 602, an obtain current POI step 604, a determine information from POI step 606, a score ROI, RTS and COI step 608, a write partial score files step 610, a combine partial score files step 612, and a display results in tree step 614.

The discovery analysis is linked to the previously-described search process. After a search process is begun, the discovery analysis receives the search results (EOI, POI, etc.) and performs additional analysis. In some embodiments the discovery analysis process is called directly from the search process previously described. In one embodiment, the discovery analysis is called by the search process after the search process has determined a certain number of POI. In other embodiments, the discover process is called in response to a user input.

In the second obtain pre-existing discover results step 602, the discovery analysis process conducts a query for pre-existing discovery analysis results, which may be available if the same search has occurred at a prior time. If pre-existing discovery analysis results are available, the discovery data is loaded into kernel 202 memory, including information such as roots of interest (ROI), general identifiers (GIDS), concepts of interest (COI), repeating term sequences (RTS) or other phrases, and any other data generated through the previous discovery analysis. If no pre-existing discovery analysis is found, empty data sets are created to hold this information, as described further below.

In the next obtain current POI step 604, the discovery analysis process receives a plurality of new POI (i.e. POI generated during the currently running search as opposed to POI from the pre-existing discovery analysis). The discovery analysis process receives the POI from the search process as they become available, and sends sets of POI to available kernels 202 of the system 100 for analysis, allowing analysis to occur in parallel.

During the next determine information from POI step 606, the processing kernel 202 analyzes the set of POI to obtain certain statistics, including the ROI, repeating term sequences (RTS), concepts of interest (COI), and general identifiers (GID). In general, the statistics are considered features of the POI. For example, an exemplary POI may have the ROI 'plant' as a feature. The exemplary POI may also have the COI 'control . . . operator' as a feature, but not the GID 'DPR-82'.

Roots of interest (ROI) are a list of common repeating root terms sorted in occurrence of count order. For instance, if the term 'valve' was found 5 times and the term 'valves' was found 4 times, the ROI term would be 'valve' (the root of 'valves') and the occurrence count would be 9. Repeating term sequences (RTS) are a list of often occurring phrases (term sequences) such as 'control room'. Phrases generally have 2-4 terms in contiguous order. The RTS are also sorted in occurrence order.

The COI is a list of common repeating concepts. Concepts are similar to phrases, except that the concept terms may be separated by other terms, and variations are included. A concept example is 'power . . . unit+variations of unit'.

General identifiers (GID) are non-word terms, such as '3.2.5' (indicating a document section), 'DPR-80' (a license number), or 'I-E-FUEL-PUMP-021' (a location for a specific pump). The GID are also sorted in occurrence count order.

In the next score ROI, RTS and COI step 608, the items in each list are scored. Scoring reduces low importance features allowing high-value features to bubble to the top. For example, the term 'and' is very common, but conveys very little value compared to the term 'pump' and will thus 'pump' will have a higher score than 'and', even if 'and' occurs more often. To score the ROI, the frequency of occurrences in the POIs is divided by the average frequency of the term as found in the entire set of text files. Frequency of terms is found in the dictionary module 114.

The RTS are scored using the frequency calculation as for the ROI, with the addition that English language high frequency terms are further reduced in importance if they occur as a first or a last term in the phrase. For example, the phrase 'the broken pump handle had' would score lower than the phrase 'pump had a broken handle'. Additionally, the score for each phrase is multiplied by the number of occurrences of that exact term sequence. For example, a term sequence 'the broken pump handle had' occurs 12 times. The phrase score would be reduced to near zero due to the high frequency term 'the' as the first term and the high frequency term 'had' as the last term. However, the related subphrase 'broken pump handle' would have a comparatively higher score as the first and last terms 'broken' and 'handle' are not high frequency terms.

To score COI, the same procedure is used as for the RTS. To score the GIDS, a simple occurrence count is used, with higher occurrence having a higher score.

In the next write partial score files step 610, the highest scores for each feature type are written out as 'partial' files, for each group of POI analyzed by the kernel 202.

The process then proceeds to the combine partial score files step 612. The analysis steps described above are occurring in parallel as multiple kernels 202 (and optionally multiple processing nodes 108) work concurrently to analyze the sets of POI as they are being generated. Once a specific number of partial files are available, an aggregator process combines the partial files for each feature type, summing the scores across the partials being combined to produce a grand score. For example, if one kernel processed 24 POI and found 32 occurrences of the ROI 'control', and a different kernel processed 5 POI and found 3 occurrences of the ROI 'control', the combined occurrence count for the ROI 'control' would be 37.

In the final display results in tree step 614, the aggregated score files described above are displayed for the user in a tree format, allowing the user to expand an item of interest. An exemplary tree display 700 is shown below in FIG. 5.

Figure 5:
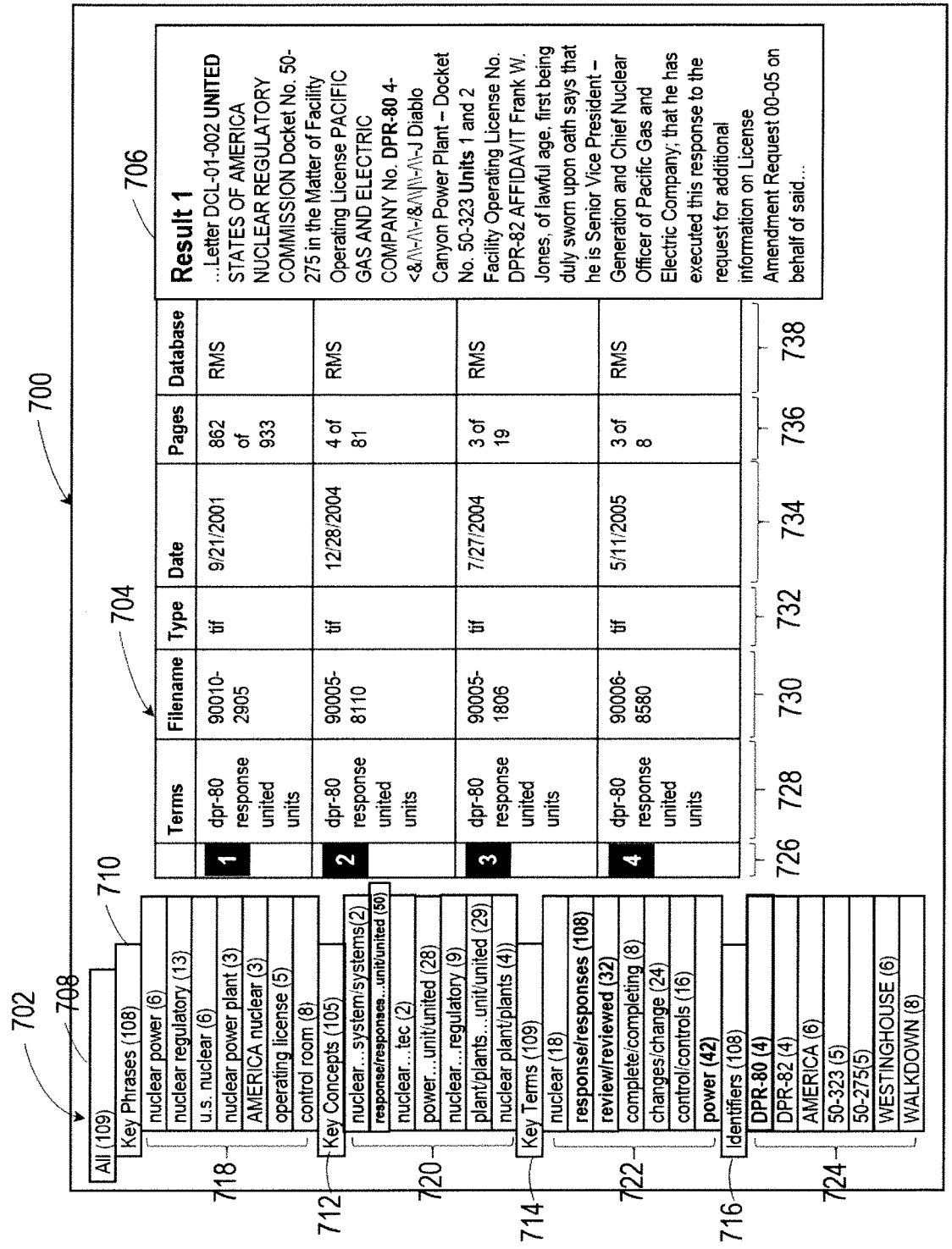
FIG. 5 is an exemplary tree display resulting from an exemplary discover analysis process.

Referring next to FIG. 5, the exemplary tree display 700 resulting from an exemplary discover process is shown. Shown are a term table 702, an item table 704, an item 706, an all heading 708 a key phrases heading 710, a key concepts heading 712, a key terms heading 714, an identifiers heading 716, a plurality of key phrases 718, a plurality of key concepts 720, a plurality of key terms 722, a plurality of identifiers 724, an identifying number column 726, a term column 728, a file type column 730 a date column 734, a pages column 736), and a database column 738.

The exemplary tree display 700 is typically displayed on a display for user viewing and interaction with the discover results. The three main components of the tree display 700 are the term table 702, the item table 704, and the item 706.

It will be understood that the exemplary display 700 is a snapshot at one point in time, and by selection of various items in the display 700 the user may expand, condense, and display alternate data or versions of the data.

In the exemplary tree display 700, the term table 702 is shown in an expanded form. A base heading is the "all" heading 708, which encompasses all of the search results. In the search of FIG. 5, a total of 109 files have been returned. Under the all heading, a plurality of sub-headings have been expanded: the key phrases heading 710, the key concepts heading 712, the key terms heading 714, and the identifiers heading 716.

The key phrase heading 710 is shown with the plurality of with key phrases 718 (RTS) expanded under the key phrase heading 710. The key concepts heading 712 is shown with the plurality of key concepts 720 (COI) shown expanded under the key concepts heading 712. The key terms heading 714 is shown with the plurality of key terms 722 (ROI) shown expanded under the key terms heading 714. The identifiers heading 716 is shown with the plurality of identifiers 724 shown expanded under the identifiers heading 716.

The user has selected a plurality of terms from the expanded term table 702, indicated by bolded items. Files/documents satisfying the selected terms are displayed in the item table 704. In the embodiment shown in FIG. 5, for each document the item table 704 includes the identifying number (as shown in the identifying number column 726), the selected search terms found in the file (as shown in the term column 728), the file type (as shown in the file type column 730), the date of the file (as shown in the date column 734), location of the search within the document (as shown in the pages column 736), and the database (as shown in the database column 738) where the document was sourced. The user has further selected the term DPR-80 as a primary search term from the identifiers heading 716 and the system responded by displaying the item table 704.

The user can then select one of the documents shown in the item table 704 for a display of the relevant portion of the document. In the exemplary display 700 of FIG. 5, the user has selected the item designated as 1, and the relevant portion of item 1 is displayed as the item 706. Search terms are indicated in the item display 706, in the exemplary display 700 by bolding the terms ('UNITED', 'DPR-80' and 'Units' for item 1).

The aggregated discoveries are displayed in the tree format, allowing the user to expand an item of interest. The number of POI that include a term are shown, giving the user an idea of how common the term is. A given POI may appear under many features. Under each feature, if there are a sufficient number of POI with the feature, the feature may be divided further using the same categories as above.

In this way, the user can navigate the tree and end up with the same results via different discovery pathways. In one example, the user could expand the search term 'control' and then expand the identifier DPR-80, resulting in a display indicating 32 documents. Alternatively, the user could first look at the identifier DPR-80, then 'control', and arrive at the same set of documents.

Additional analysis options are available after completion of the discover analysis process. In one embodiment, time charts of items from the discover tree can be displayed, showing how the items in the discover tree occur over time. Multiple time charts can be compared. In one embodiment the system 100 performs linear correlations on time chart data. For example, an analysis between time charts for the POI including phrase "valve failure" compared to the POI for the term "outage" could results in a statistical result of a correlation of 0.67 (i.e. 67% of the variation is accounted for by the linear relationship in the model) and a probability of 0.446 (i.e. a 4.5% probability that the relationship is due to chance.

Figure 6:
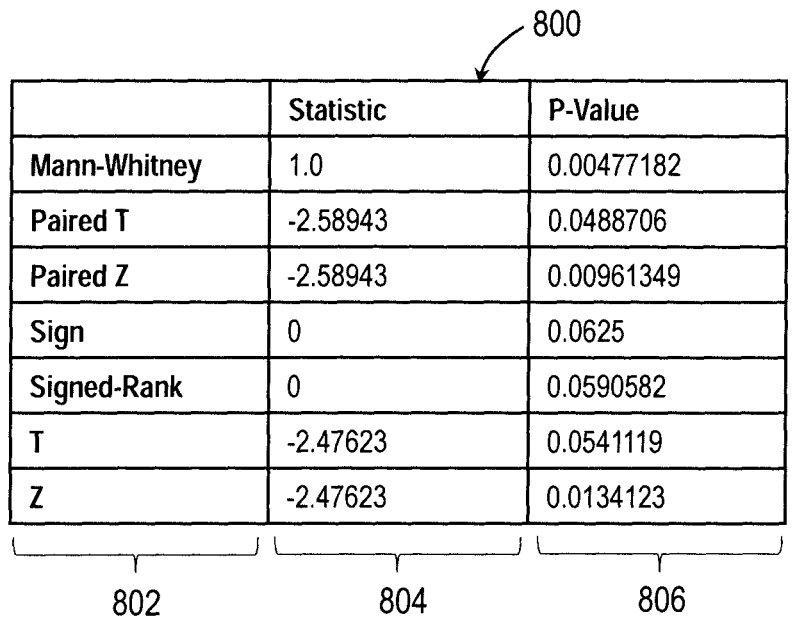
FIG. 6 is an exemplary statistical data chart based on results of the enterprise search method.

Referring next to FIG. 6, an exemplary statistical data chart 800 is shown. Shown are a statistical test identifier column 802, a test statistics column 804, and a probability value column 806.

In another embodiment, the system 100 can determine a probability as to whether any given sequence of time chart data is from a same population as another sequence. For example, for a time chart spanning one year, determining the chance that the first 6 months of data is from the same population as the last 6 months of data. The system 100 can return the results for statistical tests, for example, Mann-Whitney, Paired T, Paired Z, Sign, Signed-Rank, T and Z, as shown in the statistical data chart 800 by the statistical test identifier column 802. For each statistical test, in one embodiment the system 100 returns at least one statistical value and a probability value. In the exemplary statistical data chart 800, a plurality of statistical values are shown in the test statistics column 804, each test statistic the results of the statistical test identified in the same row. For example, the Mann-Whitney test has resulted in the test statistic equal to 1.0. A plurality of probability values (or P-value) derived from the corresponding statistical test are shown in the probability value column 806. For example, the probability value for the Mann-Whitney test is 0.00477182, or about a 4.8% probability.

Figure 7:
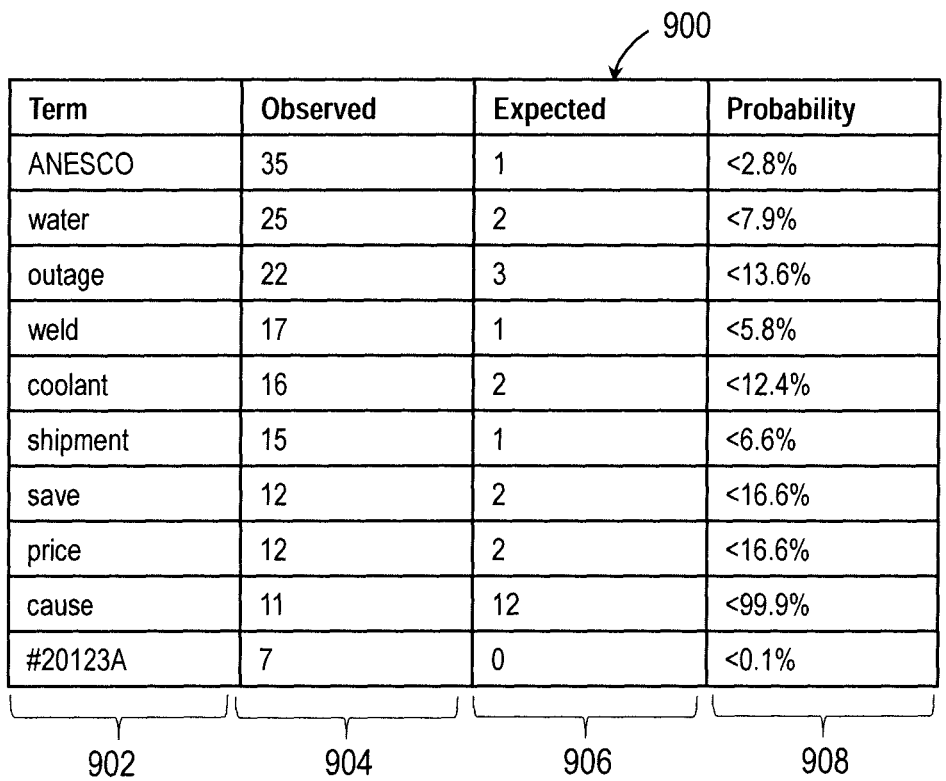
FIG. 7 is an exemplary commonality table based on results of the enterprise search method.

Referring next to FIG. 7, an exemplary commonality table 900 is shown in one embodiment of the present invention. Shown are a term column 902, an observed occurrences column 904, an expected occurrences column 906, and an expectation probability column 908.

The commonality table 900 represents the results of an exemplary commonality analysis of the documents in an exemplary root of interest (ROI). The term column 902 includes the terms of the root of interest. Note that the terms are not necessarily words, for example, the term '#20123A' is included.

The observed occurrences column 904 includes an observed number of occurrences for each term in the root of interest. For example, the term 'ANESCO' occurs 35 times in the POI. The third expected occurrences column 906 includes the expected occurrences for each term. The expected occurrence for each term is a calculated expected number of times that the system 100 would expect the term to appear in the POI. In the exemplary table, the expected occurrences for the term 'ANSECO' is 1, in this case quite different from the number of occurrences 35.

The last expectation probability column 908 includes a calculated expected probability for each term, based on the expected versus observed occurrences. Using the 'ANESCO' term again, there is a less than 2.8% probability that the POI should have 35 occurrences while only 1 was expected. This low probability may be worth investigating. In contrast, the term 'cause' occurs 11 times, and was expected to occur 12 times, with a probability of 99.9%, so indicates a normal or typical occurrence. In general, a low probability term with a high actual occurrence is an indicator of an anomaly worthy of investigation, e.g. a problem with a vendor, a process, a location, a piece of equipment, etc.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for analyzing search data obtained from a search of a set of documents, the search data including a plurality of passages of interest, wherein each of the plurality of passages of interest is a portion of one of the plurality of documents, comprising:
   a plurality of computing nodes comprising at least a processor coupled to a non-transitory memory;
   at least one network-attached storage device coupled to the plurality of computing nodes;
   a system management module comprising at least a processor coupled to a non-transitory memory, the system management module coupled to the plurality of computing nodes and configured to run at least one system management software;
   a network management module coupled to the system management module and configured to communicate with a network, wherein the system is configured to perform the steps of:
      determining all unique roots of interest included in the passages of interest, wherein each root of interest corresponds to terms wherein the term is the same as the root of interest and terms wherein the root of interest is the root of the term;
      listing of all unique roots of interest for the passages of interest and a number of times terms corresponding to the root of interest occur in the passages of interest for each unique root of interest;
      ranking of roots of interest in the passages of interest in order of occurrence in the group;
      determining all unique repeating term sequences in the passages of interest, wherein each repeating term sequence comprises two or more contiguous terms;

listing of all unique repeating term sequences for the passages of interest and a number of times each unique repeating term sequence occurs in the passages of interest;

ranking of all repeating term sequences in the passages of interest in order of occurrence in the passages of interest;

determining all concepts of interest in the passages of interest, wherein each concept of interest corresponds to a first root term associated with a second different root term, wherein each concept of interest is an occurrence, in one passage of interest, of one term of a first term group occurring in the passage of interest prior to the occurrence of one term of a second term group, the first term group consisting of the first root term and stems of the first root term and the second term group consisting of the second root term and stems of the second root term, wherein the one of the first term group is separated from the one of the second term group by at least one other term and by fewer than a predetermined context window of terms;

identifying of all unique concepts of interest for the passages of interest; and listing of all unique concepts of interest for each group and a number of times each unique concept of interest occurs in the passages of interest.

2. The system for analyzing search data of claim 1, further comprising the step of:

scoring each of the roots of interest.

3. The system for analyzing search data of claim 2, wherein scoring each of the roots of interest includes determining the score for each root of interest by dividing a frequency of occurrence of that root of interest in the passages of interest by an average frequency of occurrence of that root of interest in the plurality of documents.

4. The system for analyzing search data of claim 1, further comprising the step of:

scoring each of the repeating term sequences.

5. The system for analyzing search data of claim 4, wherein the step of scoring each of the repeating term sequences includes determining the score for each repeating term sequence by dividing a frequency of occurrence of that repeating term sequence in the passages of interest by an average frequency of occurrence of that repeating term sequence in the plurality of text documents.

6. The system for analyzing search data of claim 5, wherein the step of scoring each of the repeating term sequences further includes reducing the score for the repeating term sequence for a high-frequency term occurring as a first term of that repeating term sequence.

7. The system for analyzing search data of claim 5, wherein the step of scoring each of the repeating term sequences further includes reducing the score for the repeating term sequence for a high-frequency term occurring as a last term of that repeating term sequence.

8. The system for analyzing search data of claim 5, wherein the step of scoring each of the repeating term sequences further includes multiplying the score by a number of occurrences of that repeating term sequence in the passages of interest.

9. The system for analyzing search data of claim 1, further comprising the step of:

scoring each of the concepts of interest.

10. The system for analyzing search data of claim 9, wherein scoring each of the concepts of interest includes determining the score for each concept of interest by dividing a frequency of occurrence of that concept of interest in the passages of interest by an average frequency of occurrence of that concept of interest in the plurality of documents.

11. The system for analyzing search data of claim 10, wherein the step of scoring each of the concepts of interest further includes reducing the score for the concept of interest for a high-frequency term occurring as a first term of that concept of interest.

12. The system for analyzing search data of claim 10, wherein the step of scoring each of the concepts of interest further includes reducing the score for the concept of interest for a high-frequency term occurring as a last term of that concept of interest.

13. The system for analyzing search data of claim 10, wherein the step of scoring each of the concepts of interest includes multiplying the score by a number of occurrences of the repeating term sequence in the passages of interest.

14. The system for analyzing search data of claim 1, further comprising the steps of:

determining all unique general identifiers in each group, wherein each general identifier comprises a non-word term in the passages of interest;

listing of all unique general identifiers and a number of times each unique general identifier occurs in the passages of interest; and ranking of all general identifiers in each group in order of occurrence in the passages of interest.

15. The system for analyzing search data of claim 14, further comprising the step of:

scoring each general identifier.

16. The system for analyzing search data of claim 15, wherein scoring each of the general identifiers includes determining the score for each general identifier by dividing a frequency of occurrence of that general identifier in the passages of interest by an average frequency of occurrence of that general identifier in the plurality of documents.

\* \* \* \* \*